United States Patent [19]
Kano et al.

[11] Patent Number: 5,326,028
[45] Date of Patent: Jul. 5, 1994

[54] SYSTEM FOR DETECTING INDOOR CONDITIONS AND AIR CONDITIONER INCORPORATING SAME

[75] Inventors: Hiroshi Kano, Kyoto; Masakazu Asano, Neyagawa, both of Japan

[73] Assignee: Sanyo Electric Co., Ltd., Osaka, Japan

[21] Appl. No.: 111,068

[22] Filed: Aug. 24, 1993

[30] Foreign Application Priority Data

Aug. 24, 1992 [JP] Japan .................................. 4-224142
Mar. 3, 1993 [JP] Japan .................................. 5-042748

[51] Int. Cl.$^5$ .................. F24F 7/00; G01B 11/28
[52] U.S. Cl. .................................. 236/49.3; 236/51; 33/1 V; 356/380
[58] Field of Search ................ 236/49.3, 51; 33/1 V; 73/149; 356/379, 380

[56] References Cited

U.S. PATENT DOCUMENTS 3,819,918 6/1974 Hale .................................. 356/380 X
5,235,398 8/1993 Miller et al. .................... 356/380 X

FOREIGN PATENT DOCUMENTS 2-10045 1/1990 Japan .
2-276908 11/1990 Japan .
4316945 11/1992 Japan .................................. 236/51

Primary Examiner—William E. Wayner
Attorney, Agent, or Firm—Armstrong, Westerman, Hattori, McLeland & Naughton

[57] ABSTRACT

A system to be installed within a room for detecting indoor condition data such as the interior area of the room and the number and position of occupants therein comprises an LED array for emitting a spotlight to form a multiplicity of light spots one by one successively as dispersed on the interior surface of the room at approximately equal spacings. The spotlight is projected from the array on the interior surface and concentrated on a one-dimensional PSD upon reflection. The indoor condition data is calculated by using triangulation for the optical system and output currents of the PSD as input signals.

5 Claims, 12 Drawing Sheets

SYSTEM FOR DETECTING INDOOR CONDITIONS AND AIR CONDITIONER INCORPORATING SAME

FIELD OF THE INVENTION

The present invention relates to systems for detecting indoor conditions such as the interior area of rooms and the number of occupants, and to air conditioners for air-conditioning indoor spaces under automatic control according to the detected indoor conditions.

BACKGROUND OF THE INVENTION

For use in rooms of varying areas, conventional common air conditioners are prepared as classified according to the maximum operating capacity into different types corresponding to several categories into which the room areas are classified. For installation in an actual room, an air conditioner of particular type is selected which corresponds to the category in which the area of that room belongs. Thus, air conditioners of the same type are selected for rooms of different areas if the room areas are within a category.

However, these conventional air conditioners are controlled in the same way despite the difference in room area if the room areas are within the same category, so that the indoor spaces are not always air-conditioned comfortably, for example, owing to an excessive or insufficient amount of air flow. Further even if the room area is in match with the operating capacity, the indoor conditions vary depending on the number or position of occupants, whereas the air conditioner is not controlled in accordance with such variations.

As disclosed in Unexamined Japanese Patent Publication HEI 2-10045, therefore, a system has been proposed which comprises a CCD or like solid image pickup device and a ultrasonic sensor for detecting indoor conditions to automatically air-condition the indoor space according to the detected result.

With this conventional system, indoor image data is fed to a memory from the CCD in advance, and when persons have entered the room, the number of occupants of the room is detected from the difference between the image data then obtained and the stored image data. The distance to the occupants is detected from signals from the ultrasonic sensor. The operating capacity or amount of air flow is controlled in accordance with the indoor conditions detected.

The conventional system requires not only a complex peripheral circuit for the image processing of output of the CCD but also a circuit for causing the ultrasonic sensor to scan the entire interior of the room. The arrangement for detecting the indoor conditions is therefore extremely complex to entail the problem of making the overall system large-sized. Moreover, the measurement of distances by the ultrasonic sensor involves great errors.

On the other hand, a system has been proposed for measuring the distances to articles by resorting to scanning with a light beam and the principle of triangulation as disclosed in Unexamamined Japanese Patent Publication HEI 2-276908. This measuring system has a light detecting surface comprising a PN junction face and employs a position sensitive light detector for outputting a signal corresponding to the position of a spotlight incident on the light detecting surface. The system gives measurements with higher accuracy than the ultrasonic sensor which affords distance measurements. The measuring system nevertheless has the problem of being unable to measure the interior area of rooms or the number of occupants and needing a scanning circuit.

SUMMARY OF THE INVENTION

An object of the present invention is to provide an indoor condition detecting system having a simple construction for detecting indoor condition data including data as to the area of an indoor space and the number and position of occupants thereof without using a CCD or like image pickup device and a scanning circuit.

Another object of the invention is to provide an air conditioner which is controllable for air-conditioning an indoor space optimally at all times according to indoor condition data including data as to the area of the indoor space and the number and position of occupants thereof.

With the indoor condition detecting system of the present invention, light-emitting means disposed within a room as oriented toward the interior surface thereof comprising a wall surface and a floor surface is driven to emit a spotlight having an optical axis extending from one point toward the interior surface and oriented toward successively varying directions, thereby forming a multiplicity of light spots one after another which are dispersed on the interior surface at approximately equal spacings. Optical means is disposed beside the light-emitting means at a specified distance therefrom for concentrating light reflected from a reflecting surface provided by the interior surface or an object inside the room. A position sensitive light detector (hereinafter referred to briefly as "PSD") is disposed at the position where the reflected light is concentrated. First arithmetic means calculates the three-dimensional coordinates of a reflecting position on the reflecting surface from a signal output from the PSD and serving as input data, based on the principle of triangulation of three positions, i.e., a focal position of the light-emitting means, the position of center of the optical means and the reflecting position. Second arithmetic means calculates indoor condition data based on the result of calculation of reflecting positions over the entire region of the reflecting surface.

With the above indoor condition detecting system, the light-emitting means can be provided, for example, by a multiplicity of LEDs arranged radially and oriented toward the wall surface inside the room. In this case, the LEDs are successively turned on, whereby the multiplicity of light spots are formed one after another as dispersed on the interior surface at approximately equal spacings.

One spotlight from the light-emitting means is reflected from the interior surface of the room upon incidence thereon when there is no occupant in the room, or is reflected from the surface of an occupant when the occupant is present therein. The reflected light passes through the optical means and is concentrated on the light detecting surface of the PSD. If the position of the reflecting surface alters, the position where the light is incident on the light detecting surface of the PSD also varies. Thus, the PSD outputs a signal which varies with the position.

With respect to each spotlight emitted by the light-emitting means, the focal position of the light-emitting means and the orientation of optical axis of the spotlight are known in advance. Further with respect to the light reflected at the reflecting surface and incident on the PSD through the optical means, the position of center of the optical means is known in advance, and the orientation of optical axis of the reflected light can be determined from the position where the light is incident on the PSD. Accordingly, the three-dimensional coordinates of the reflecting position can be calculated as the point of intersection of the optical axis of the spotlight and the optical axis of the reflected light based on the principle of triangulation.

The three-dimensional coordinates of reflecting positions over the entire region of the reflecting surface are calculated, and indoor condition data is further calculated from the results of calculation. More specifically, when there is no occupant in the room, the coordinates of many reflecting positions dispersed over the interior surface at approximately equal spacings are determined, and the interior area of the room can be calculated from the results. When an occupant or occupants are present in the room, the coordinates of many reflecting positions as dispersed on the surfaces of these occupants at approximately equal spacings are determined for the system to calculate the number and position of the occupants from the results.

The calculation results thus obtained are delivered to the control circuit of an air conditioner, illumination device, AV device or the like for controlling such a device.

The present invention also provides an air conditioner which comprises the above indoor condition detecting system, and indoor condition memory means for storing the result of calculation obtained by the second arithmetic means when no occupant is present in the room and the result of calculation obtained by the second arithmetic means when one or a plurality of occupants are present in the room. The operation of the air conditioner is controlled in accordance with the data stored in the memory means.

The room equipped with the air conditioner can be air-conditioned as controlly optimally at all times in accordance with indoor condition data which includes data detected by the indoor condition detecting system and relating to the interior area of the room and the number and position of occupants therein. For example, the amount of air flow is automatically adjusted in accordance with the size of the room, or when many people are present concentrically locally within the room, the conditioner produces an increased air flow and alters the orientation of the air flow toward the location of the occupants.

DETAILED DESCRIPTION OF EMBODIMENTS

Embodiments of the present invention will be described below in detail with reference to the drawings.

First Embodiment

Figure 1:
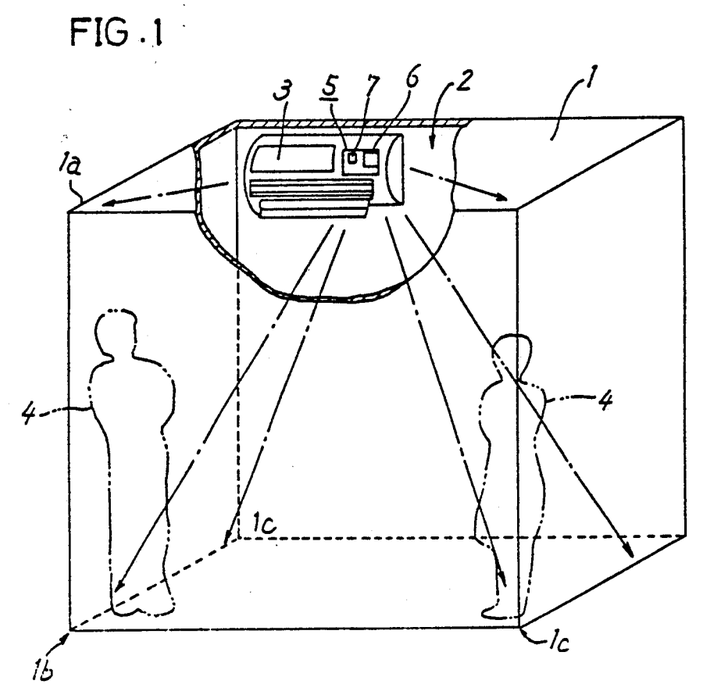
FIG. 1 is a perspective view partly broken away and showing an air conditioner of the invention as installed on the interior wall of a room.
Figure 2:
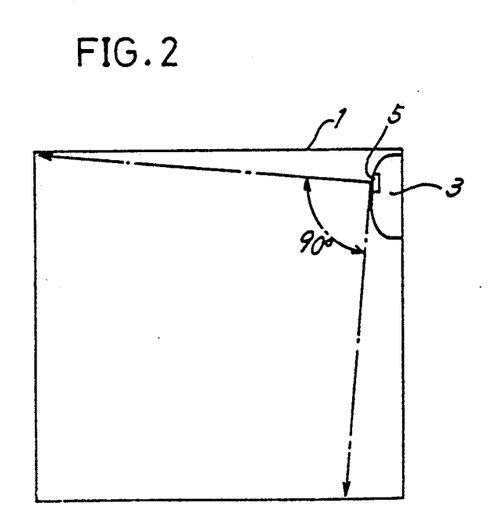
FIG. 2 is a side elevation showing an angle of field of an indoor condition detecting unit incorporated in the air conditioner.

With reference to FIGS. 1 and 2, an air conditioner 3 is attached to an upper portion of a wall 2 inside a room 1. The air conditioner 3 has incorporated therein an indoor condition detecting unit 5 for detecting the interior area of the room 1 and the number and position of occupants 4 present in the room 1 as will be described later.

Figure 3:
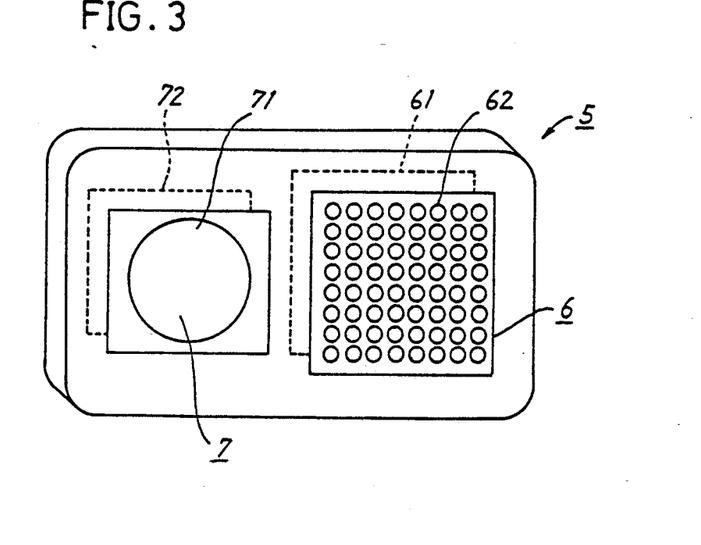
FIG. 3 is a perspective view showing the appearance of the unit.
Figure 4:
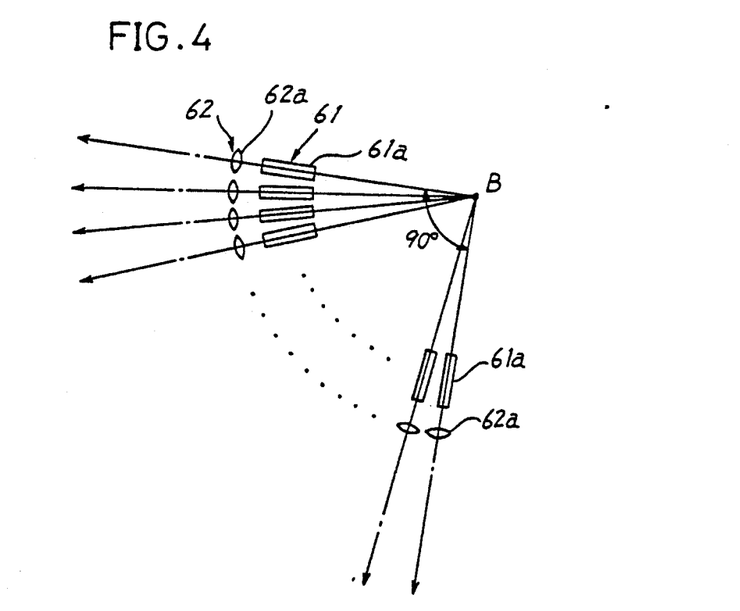
FIG. 4 is a side elevation for illustrating the construction of a light-emitting assembly of the unit.

The indoor condition detecting unit 5 comprises a light-emitting assembly 6 and a light-receiving assembly 7 disposed at a specified distance therefrom as shown in FIG. 3. As seen in FIG. 4, the light-emitting assembly comprises an array 61 of 64 light-emitting diodes (LEDs) 61a in a radial arrangement spreading from a point B, and an array 62 of collimators 62a arranged on a spherical plane and each adapted to shape a light beam from the LED 61a into a spotlight comprising substantially parallel rays or having a small spreading angle. If it is assumed that the LEDs of the light-emitting assembly 6 are turned on at the same time, 64 spotlights are projected almost over the entire combined area of a vertical wall in the front and floor, forming a conically spreading-out group with a vertex angle of 90 deg as shown in FIGS. 1 and 2 and 64 light spots approximately uniformly distributed over the interior surface. These spotlights are reflected from the interior surface of the room, surfaces of furnature, surfaces of the occupants, etc. and incident on the light-receiving assembly 7.

With reference to FIG. 3, the light-receiving assembly 7 comprises a condenser lens 71 for concentrating the reflected light, and a one-dimensional PSD 71 for detecting the light concentrated by the condenser lens 71 to detect the position of concentration. The PSD 72 is disposed at the focal position of the condenser lens 72, and the light through the lens 71 is focused on the surface of the PSD 72. All the 64 light spots to be formed by the light-emitting assembly 6 can be taken into the field of view of the light-receiving assembly 7.

Figure 6:
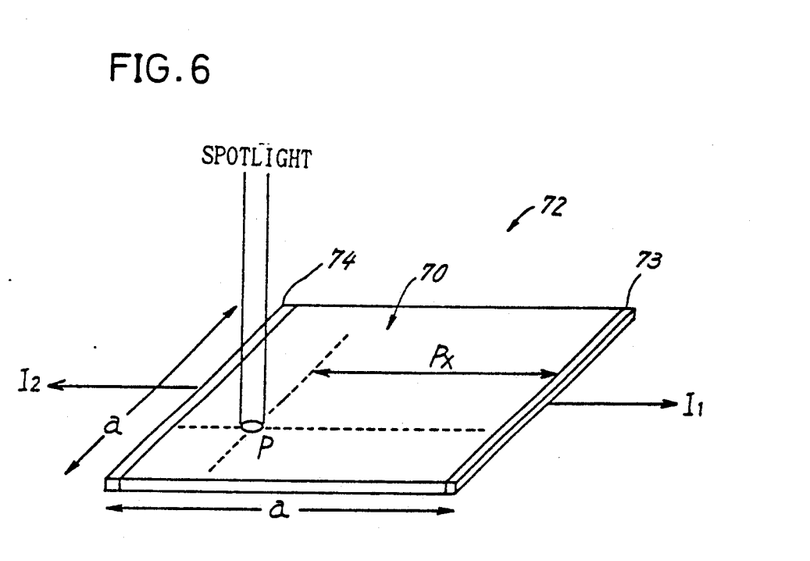
FIG. 6 is a perspective view for illustrating the construction of a one-dimensional PSD.

FIG. 6 shows the basic construction of the one-dimensional PSD 72, which has a square light detecting surface 70 and is provided with a pair of output electrodes 73, 74 at its opposite sides. When a spotlight is incident on the light detecting surface 70 as illustrated, output currents I1, I2 are produced respectively at the output electrodes 73, 74 in accordance with the position of incidence. The distance Px from one of the output electrodes, 73, to the position where the spotlight is focused is given by the following equation wherein a is the length of one side of the light detecting surface 70.

$$Px = a\{I2/(I1+I2)\} \qquad (1)$$

Accordingly, the distance Px can be determined by measuring the output currents I1, I2.

Figure 5:
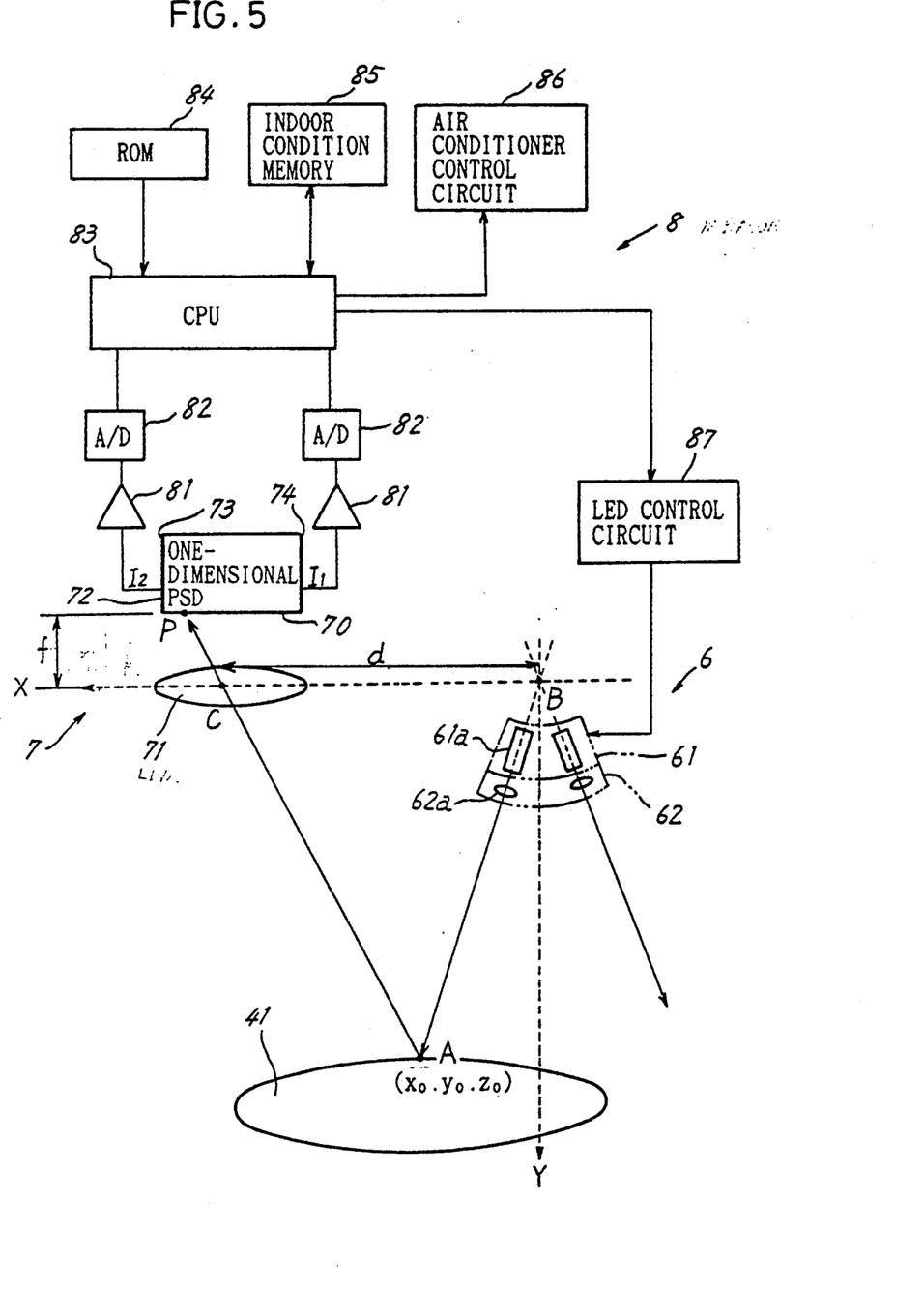
FIG. 5 is a block diagram showing the construction of a measuring circuit of the air conditioner.

The output currents I1, I2 of the one-dimensional PSD 72 are input to a measuring circuit 8, the construction of which is shown in FIG. 5. As illustrated, a command from a microprocessor 83 operates an LED control circuit 87, which in turn drives and controls the LED array 61 of the light-emitting assembly 6. Consequently, 64 LEDs 61a are turned on and off one after another, such that only one of them is on at an optional time point. The spotlight emitted by the LED 61a which is on advances along the optical axis of the LED to impinge on a reflecting surface 41 provided, for example, by the interior surface of the room or the surface of the occupant of the room, forming a light spot on the reflecting surface 41. The reflected light of the light spot is concentrated on the light detecting surface 70 of the PSD 72 via the condenser lens 71, forming an image on the surface 70.

The one-dimensional PSD 72 delivers the output currents I1, I2 from the pair of output electrodes 73, 74 in accordance with the position P where the reflected light is concentrated as previously stated. Each of these currents I1, I2 is converted to a digital voltage signal by a current-voltage converter 81 and an A/D converter 82 and thereafter fed to the microprocessor 83.

The principle of triangulation is now applied to three points, i.e., the focal position B of the LED array 61, the reflecting position A on the reflecting surface 41 where the spotlight from one LED 61a which is alight is reflected, and the position C of center of the condenser lens 71. Suppose the distance between the focal position B and the center position C of the condenser lens 71 is d, and the distance between the condenser lens 71 and the PSD 72, that is, the focal length of the lens 71 is f. With the point B taken as an origin, further suppose an axis through the point B and the point C is X-axis, an axis perpendicular to X-axis and parallel to the floor is Y-axis, and an axis perpendicular to X-axis and Y-axis is Z-axis. The optical axis of the LED 61a which is on, i.e., the straight line B-A, is then expressed by the following three equations.

$$x = k \cdot \cos \alpha$$

$$y = k \cdot \cos \beta$$

$$z = k \cdot \cos \gamma \qquad (2)$$

wherein $\alpha$ is an angle X-axis makes with the line B-A, $\beta$ is an angle Y-axis makes with the line B-A, and $\gamma$ is an angle Z-axis makes with the line B-A, these angles being known values for each of the LEDs 61a. Further k is a constant.

A plane perpendicular to X-Y plane and containing the optical axis of the reflected light extending from the reflecting point A to the point P through the point C is expressed by the following equation as the equation representing a straight line projected on X-Y plane.

$$y = -f(Px-a/2) \cdot (x-d) \qquad (3)$$

The three-dimensional coordinates (x0, y0, z0) of the point A are expressed by the following equations as the point of intersection of the plane expressed by Equation (3) and the line B-A expressed by Equations (2).

$$x0 = \cos \alpha \cdot d \cdot f / \{f \cos \alpha + (Px-a/2) \cdot \cos \beta\}$$

$$y0 = \cos \beta \cdot d \cdot f / \{f \cos \alpha + (Px-a/2) \cdot \cos \beta\}$$

$$z0 = \cos \gamma \cdot d \cdot f / \{f \cos \alpha + (Px-a/2) \cdot \cos \beta\} \qquad (4)$$

The distance L from the focal position B to the reflecting point A is expressed by the following equation $$L = \sqrt{(x0^2 + y0^2 + z0^2)} \qquad (5)$$

As already stated, the 64 spotlights from the LED array 61 constituting the light-emitting assembly 6 are emitted in a conical arrangement with a vertex angle of 90 deg, so that the area W (m²) of the reflecting surface per LED 61a is calculated by dividing the spherical surface area of segment of a sphere having a vertex angle of 90 deg and a radius of L by 64. Thus the area W is expressed by the following equation.

$$W = L^2 \int_0^{\pi/4} 2\pi \sin\theta d\theta / 64$$

$$= 0.029 L^2 \qquad (6)$$

With the output currents I1, I2 from the one-dimensional PSD 72 fed to the measuring circuit 8, the microprocessor 83 calculates the three-dimensional coordinates A0 (x0,y0,z0) of the reflecting point A and the distance L from the point B based on Equations (1), (4) and (5). Incidentally, the angles $\alpha$, $\beta$ and $\gamma$ defining the orientation of the optical axis of each of the LEDs 61a are stored in advance in a ROM 84 for each LED 61a.

The microprocessor 83 has connected thereto an indoor condition memory 85 for storing indoor condition data serving as references, such as the three-dimensional coordinates A0i (x0i,y0i,z0i) of reflecting points on the reflecting surface 41 when no occupant is present in the room, i.e., on the interior surface thereof. The microprocessor 86 also has connected thereto an air conditioner control circuit 86 for controlling the operating capacity of the air conditioner 3, direction of air flow, etc. to air-condition the indoor space.

As will be described below, the microprocessor 83 calculates the size D of interior of the room and the number N and position S of occupants of the room based on the three-dimensional coordinates A0i (s0i,y0i,z0i) (i=1—64) stored in the memory 85, and the three-dimensional coordinates Ai (xi,yi,zi) of reflecting points on the reflecting surface 41 and distances Li (i=1—64) during actual operation to control the operating capacity of the air conditioner, direction of air flow, etc. in accordance with the indoor conditions.

Figure 7:
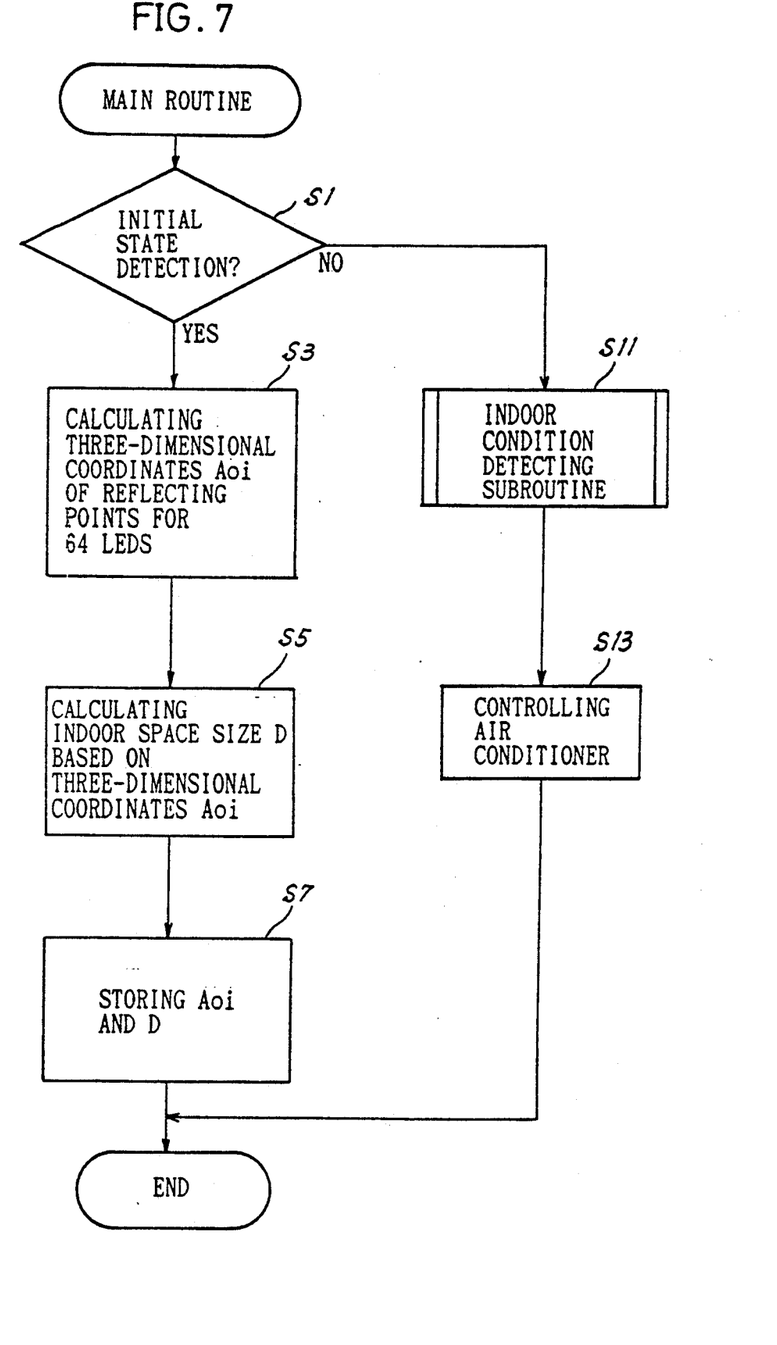
FIG. 7 is a flow chart showing the main routine of operation of the air conditioner.
Figure 8:
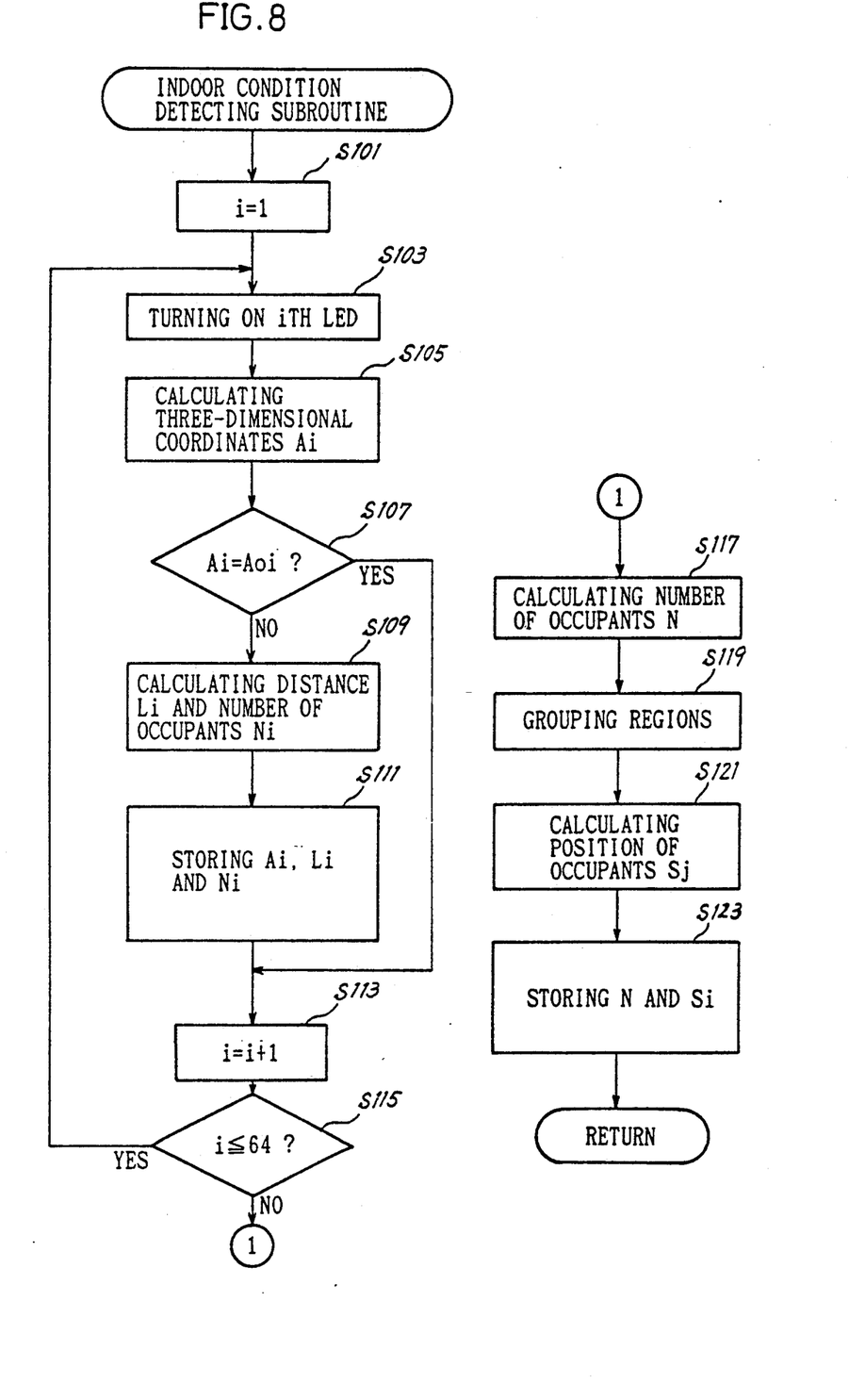
FIG. 8 is a flow chart showing a subroutine of the same.

FIGS. 7 and 8 show the control procedure to be executed by the microprocessor 83.

With reference to FIG. 7, step S1 first inquires whether the current mode is a mode for detecting an initial state wherein no occupant is present within the room. In this mode, the 64 LEDs are turned on one after another in step S3 to calculate the three-dimensional coordinates A0i (s0i,y0i,z0i) (i=1—64) of reflecting points based on the outputs of the one-dimensional PSD.

The indoor space size D is then calculated in step S5. Among the three-dimensional coordinates A0i (x0i,y0i,z0i) of the 64 points calculated, those of the three corners 1a, 1b and 1c shown in FIG. 1 are used in this step to calculate the volume D of indoor space of the room.

In step S7, the three-dimensional coordinates A0i (x0i,y0i,z0i) of the 64 points and the space size D are stored in the indoor condition memory 85, whereby the initial state detecting operation is completed.

In actual operation, the sequence proceeds from step S1 to step S11 for the execution of an indoor condition detecting subroutine. With reference to FIG. 8 showing this subroutine, i is set at 1 initially in step S101, the ith LED is turned on in step S103, and the three-dimensional coordinates Ai (xi,yi, zi) of the reflecting point P are calculated in step S105 based on the outputs of the PSD then produced.

Next in step S107, the three-dimensional coordinates A0i (x0i,y0i, z0i) stored in the indoor condition memory are compared with the three-dimensional coordinates Ai (xi,yi,zi) calculated in step S105 to check the two groups of coordinates for a match. When a match is found therebetween, step S113 follows in which the i value is incremented, further followed by the subsequent step S115.

When the two groups of coordinates are not in match in step S107, this indicates that an occupant of the room has been detected. In this case, the sequence proceeds to step S109, in which the distance Li to the reflecting point P when the ith LED is turned on and the number Ni of occupants are calculated. The distance Li is calculated from the coordinates Ai (xi,yi,zi) based on Equation (5). The number Ni of occupants refers to the number of persons detected by turning on the ith LED. Assuming that the surface area of one person is 0.75 m$^2$ and using Equation (6), the number Ni of persons to be detected per LED is expressed by the following equation.

$$Ni = (0.029Li^2)/0.75 \quad (7)$$
$$= Li^2/25$$

In step S109, therefore, the number of persons, Ni, detected by turning on the ith LED is calculated based on this equation.

In the next step S111, the coordinates Ai (xi,yi,zi), distance Li and number Ni of persons are stored in the indoor condition memory, followed by step S113, in which the value i is incremented. Step S115 thereafter follows.

Step S115 inquires whether the detection by all 64 LEDs has been completed. If the answer is negative, the sequence returns to step S103, whereas when the inquiry is answered in the affirmative, the sequence proceeds to step S117, in which the sum of numbers Ni of persons stored in the indoor condition memory is calculated to determine the total number of occupants present in the room.

Next in step S119, the regions of the reflecting surface which are provided by the surfaces of the occupants are formed into groups. More specifically, the data stored in the indoor condition memory in step S111 is used to form a group from such reflecting surface regions that the light spots thereon for the detection of reflecting points are adjacent to one another, and that the distances Li are not greater than a predetermined threshold value (up to 50 cm in the present embodiment) and match, or are approximate, to one another. Forming the group is terminated upon the sum of numbers Ni of persons exceeding 1. In this way, the detection regions for N persons within the room are formed into groups, and the reflecting surface regions are formed into j groups (j≦N).

The position Sj (j≦N) of the occupants is then determined in step S121. More specifically, the coordinates Sj of centroid of the reflecting surface regions of each group are determined based on the three-dimensional coordinates Ai (xi,yi,zi) of reflecting surface regions of each group formed in step S119.

Subsequently, the number N and position Sj of the occupants determined in steps S117, S119, S121 are stored in the indoor condition memory in step S123, followed by step S13 of the main routine shown in FIG. 7.

In step S13, the operating capacity of the air conditioner, the direction and rate of air flow to be thereby produced, etc. are automatically controlled by causing the air conditioner control circuit 86 to perform its control function according to the indoor space size D, and the number N and position Sj of occupants stored in the indoor condition memory. For example, the operating capacity is set at a higher level as the size D and the number N of occupants increase. Further the direction of air flow is controlled in accordance with the position Sj so as not to expose the occupants directly to the air flow.

Furthermore, it is possible to detect the movement of occupants from alterations in the position Sj of occupants and control the air conditioner in accordance with the detected data. For example, if the occupants move about more briskly, the operating capacity of the air conditioner is set at a higher level.

If the indoor space size is already known, the known value can be registered directly in the indoor condition memory 85 without resorting to the measurement by the measuring circuit 8.

In the case of the air conditioner described, a multiplicity of LEDs are turned on one after another for a specified period of time only, whereby the area of interior of the room and the number and position of occupants thereof can be detected. This eliminates the need for the peripheral circuit for the image processing of CCD output and the scanning circuit although these circuits are necessary in the prior art. The indoor condition detecting system can therefore be of simplified construction, consequently compacting the air conditioner.

Second Embodiment

Figure 9:
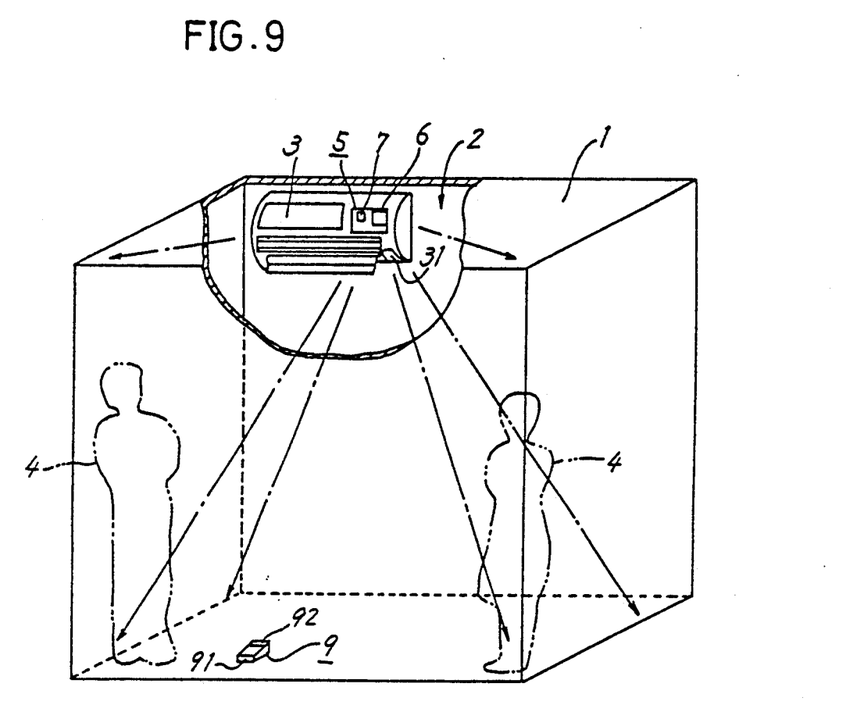
FIG. 9 is a perspective view partly broken away of an embodiment having a remote control unit as disposed within a room.

FIG. 9 shows an embodiment which comprises an air conditioner 3, and a remote control unit 9 which is separate from the body of the conditioner 3. The remote control unit 9 has a temperature sensor 91 such as a thermistor, and a signal transmitter 92 comprising an infrared light-emitting diode. A remote control signal including the internal temperature of a room detected by the sensor 91, target temperature set by inputting and operation mode (for example, cooling, heating or dehumidification) is periodically sent out in the form of an infrared spotlight from the signal transmitter 92 to the body of air conditioner 3. Attached to the body of air conditioner 3 is a signal receiver 31 for receiving the remote control signal contained in the infrared spotlight.

Figure 11:
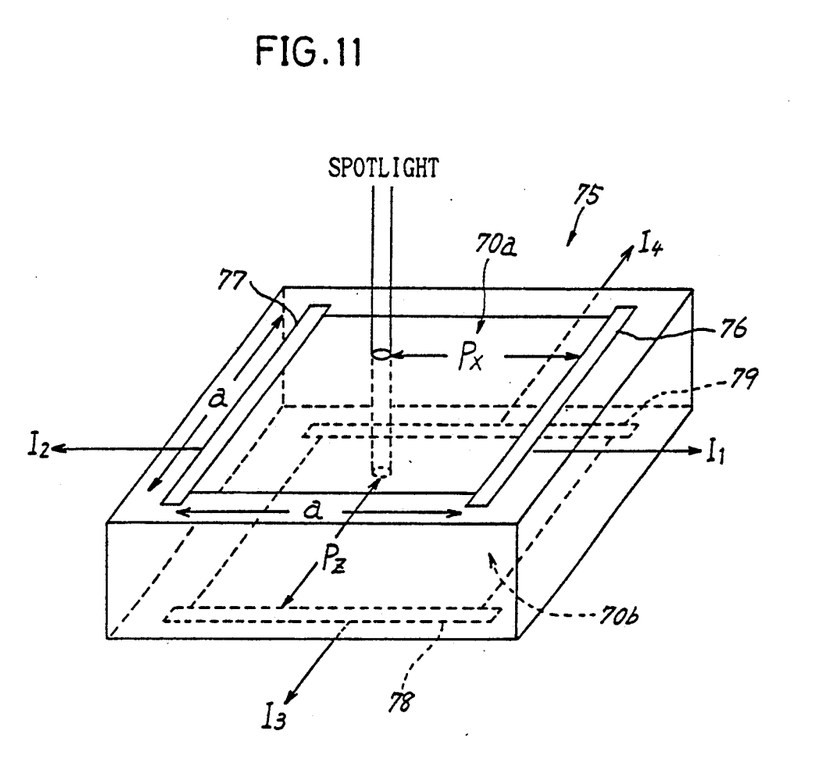
FIG. 11 is a perspective view for illustrating the construction of a two-dimensional PSD.

An indoor condition detecting unit 5 has a light-emitting assembly 6 having the same construction as the one shown in FIGS. 3 and 4. The unit 5 has a light-receiving assembly 7 which comprises a condenser lens 71, and a two-dimensional PSD 75 disposed in the rear of the lens 71 and shown in FIG. 11. As shown, the two-dimensional PSD 75 has two light detecting surfaces 70a, 70b on the respective opposite sides. One of the light detecting surfaces, 70a, is provided on the respective lateral sides thereof with a pair of output electrodes 76, 77. The other light detecting surface 70b has a pair of output electrodes 78, 79 at its opposite lateral sides extending in a direction orthogonal to the orientation of the pair of electrodes 76, 77. When the spotlight impinges on the light detecting surfaces 70a, 70b as illustrated, output currents I1, I2, I3, I4 in accordance with the position P of incidence are produced from the respective four output electrodes 76, 77, 78, 79. The distances Px, Pz from the two output electrodes 76, 78 serving as references to the image forming position of the spotlight are calculated from the following equations wherein a is the length of each side of the light detecting surfaces 70a, 70b.

$$Px = a\{I2/(I1+I2)\}$$

$$Pz = a\{I4/(I3+I4)\} \quad (8)$$

Figure 10:
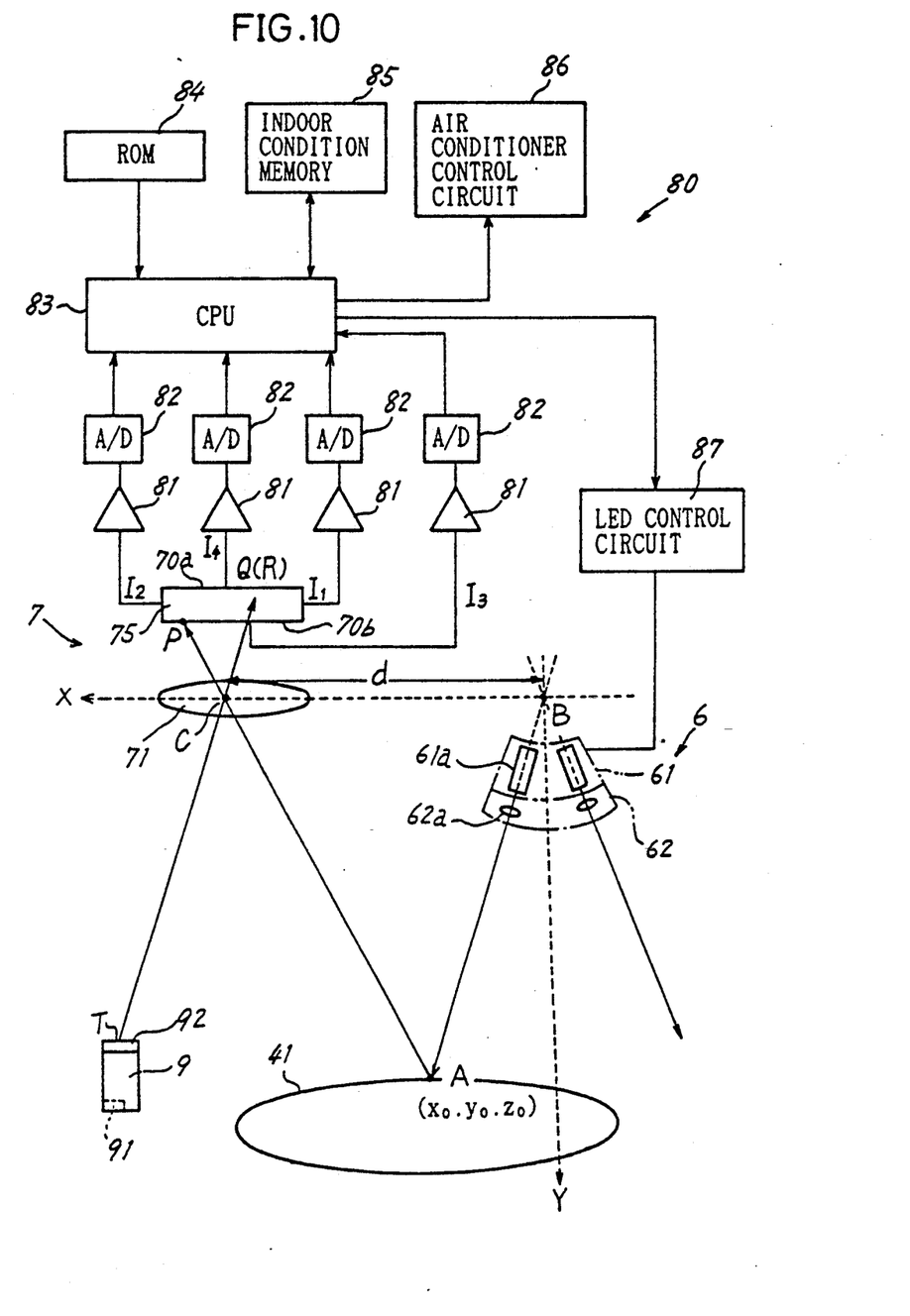
FIG. 10 is a block diagram showing the construction of a measuring circuit included in the embodiment.

The present embodiment has a measuring circuit 80, the construction of which is shown in FIG. 10. A spotlight from an LED array 61 is reflected at a reflecting surface 41, and the reflected light is incident on the light-receiving assembly 7 as in the first embodiment.

On the other hand, the infrared spotlight from the remote control unit 9 is received by the signal receiver 31 and concentrated by the condenser lens 71 to form an image on the two light detecting surfaces 70a, 70b of the two-dimensional PSD 75.

As to timing, an LED control circuit 87 is so controlled by a microprocessor 83 that one of the LEDs of the array 61 is turned on during a period during which no remote control signal is transmitted from the remote control unit 9.

Each of the outputs currents I1 to I4 of the PSD 75 is converted by a current-voltage converter 81 and an A/D converter 82 to a digital voltage signal, which is then fed to the microprocessor 83, which in turn calculates the size of interior of the room, the number and position of occupants therein and the position of the control unit 9. The results of calculation are stored in an indoor condition memory 85 along with the temperature set by the control unit 9 and the temperature thereby detected.

The size of interior of the room and the number and position of occupants are calculated in the same manner as in the first embodiment. With reflected light impinging on the light detecting surface 70a of the PSD 75 and with the output currents I1, I2 input to the measuring circuit 80, the microprocessor 83 calculates the three-dimensional coordinates A0 (x0,y0,z0) of the reflecting point A and the distance of the point A from the point B based on Equations (1), (4) and (5).

On the other hand, with respect to the infrared spotlight emitted by the signal transmitter 92 of the remote control unit 9, suppose the positions of image forming points on the respective light detecting surfaces 70a, 70b of the PSD 75 are a point Q and a point R, respectively, and the position of the signal transmitter 92 of the unit 9 is a point T. A plane containing the optical axis of the spotlight extending from the point T to the point Q through the point C and perpendicular to X-Y plane is then expressed by same equation as Equation (3). A plane containing the optical axis of the spotlight extending from the point T to the point R through the point C and perpendicular to Z-Y is expressed by the following equation which represents a straight line projected on Z-Y plane.

$$y = -f(Pz-a/2) \cdot z \quad (9)$$

The signal transmitter 92 of the control unit 9 is present at a position on the line of intersection of the plane expressed by Equation (3) and the plane expressed by Equation (9) at which position the intersection line intersects the reflecting surface 41 (which is usually a wall surface).

With the output currents I1, I2 input from the two-dimensional PSD 75 to the measuring circuit 80, the microprocessor 80 therefore calculates the three-dimensional coordinates A0i (x0,y0,z0) of the reflecting point A on the reflecting surface 41 and the distance L from the point B to the point A based on Equations (1), (4) and (5). With the output currents I1 to I4 input from the PSD 75 to the measuring circuit 80, the microprocessor 80 also calculates the direction in which the signal transmitter 92 of the unit 9 is present, based on Equations (3) and (9), and further determines the position T of the transmitter 92 based on the direction.

In response to a command from the microprocessor 83, an air conditioner control circuit 86 optimally controls the operating capacity of the air conditioner, direction of air flow therefrom, etc. in accordance with the data stored in the indoor condition memory 85, i.e., the size D of interior or indoor space, number N and position Sj of occupants therein, position T of the control unit 9, target temperture setting and detected temperature.

Figure 12:
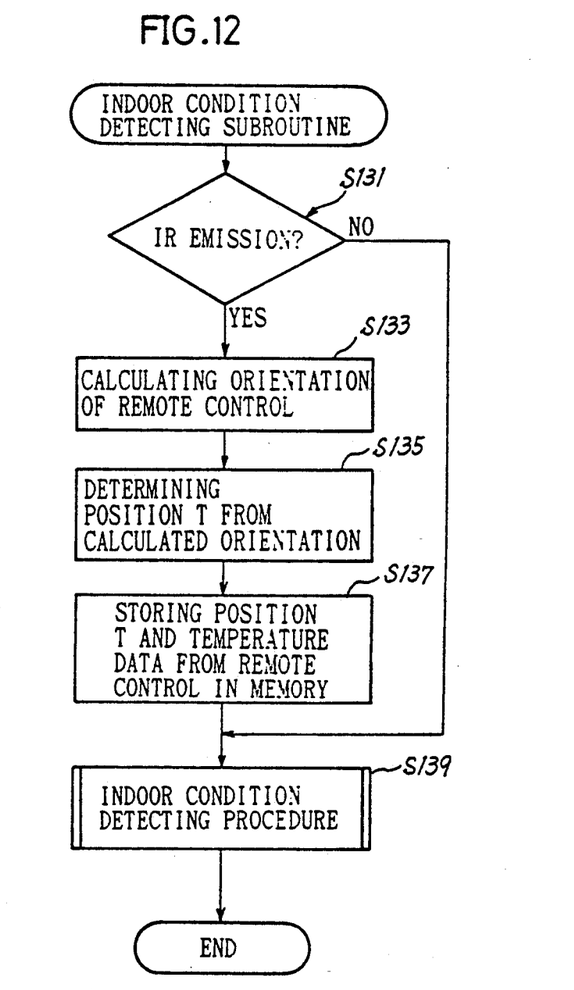
FIG. 12 is a flow chart of a subroutine showing the operation of air conditioner of the embodiment.

The control procedure to be executed by the microprocessor 83 is the same as is shown in FIG. 7 insofar as the main routine is concerned, whereas steps S131 to S137 shown in FIG. 12 are executed first in the indoor condition detecting subroutine.

First step S131 inquires whether an infrared spotlight is being transmitted from the remote control unit 9. If the answer is NO, step S139 follows, while if the answer is YES, step S133 follows.

In step S133, the direction in which the remote control unit 9 is present is calculated from the outputs of the PSD due to the infrared spotlight from the unit 9. Further in step S135, the three-dimensional coordinates of the point where an extension of this direction intersects the reflecting surface are read from the indoor condition memory 85, and the coordinates are registered as the position T of the control unit 9.

Next in step S137, the position T of the unit 9 and the temperature data (target temperature setting and detected temperature) from the unit 9 are stored in the memory 85. The indoor condition detecting procedure of step S139 then follows. This procedure comprises the same steps as steps S101 to S123 shown in FIG. 8.

After the subroutine has been executed, step S13 of FIG. 7 follows to control the air conditioner. According to the present embodiment, the position T of the control unit 9 and the temperature data therefrom which are stored in the indoor condition memory are used to speculate the ambient temperature at each position Sj of the occupants, and the operating capacity of the air conditioner is so controlled that the ambient temperature will become the target temperature set by the remote control unit 9. This realizes a highly comfortable air-conditioned state.

Third Embodiment

Figure 13:
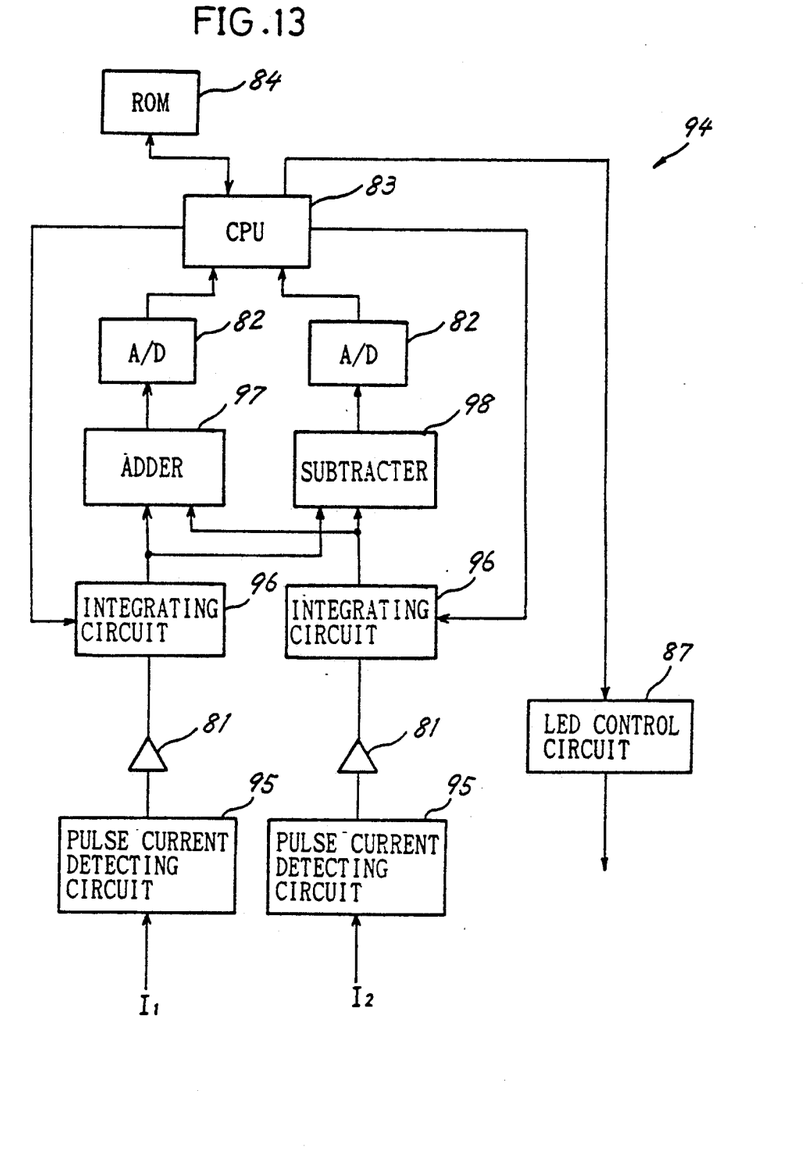
FIG. 13 is a block diagram showing the construction of another measuring circuit.

FIG. 13 shows the construction of another example of measuring circuit to which the output currents I1, I2 of the one-dimensional PSD 72 shown in FIG. 5 are input.

In the measuring circuit which is indicated at 94, the following equation is used in place of Equation (1) to calculate the distance Px.

$Px = Px' + b$ wherein $b = a/2$ $Px' = b(I2-I1)/(I1+I2)$ (10)

Further with the present embodiment, the LED is turned on in a pulsating manner for 100 microseconds under the control of an LED control circuit 87, and variations in the currents produced from the PSD 72 during the on-period are taken into the measuring circuit 94.

In this case, the variation in each of the output currents I1, I2 of the one-dimensional PSD is detected by a current detecting circuit 95, and the current variation is converted by a current-voltage converter 81 to a voltage signal. The voltage signal is further fed to an integrating circuit 96 and integrated until a time point when a command is given by a microprocessor 83, whereby the signal is converted to a digital voltage signal not lower than a predetermined level. The digital signals thus obtained are fed to an adder 97 and a subtracter 98 to calculate the difference (I2−I1) between the output currents I1, I2 and the sum (I1+I2) thereof in Equation (10). The results of calculation are fed via an A/D converter 82 to the microprocessor 83, which in turn calculates the distance Px based on Equation (10).

With the present embodiment, the LED is turned on in a pulsating manner, and the variations in the currents I1, I2 produced in the one-dimensional PSD are fed to the measuring circuit 94. This removes the current component produced in the PSD due to environmental light other than the light from the LEDs. Accordingly, the image forming position of the spotlight from the LED array on the PSD can be detected accurately regardless of the presence or absence of environmental light.

In this case, the microprocessor 83 gives a reset signal to the integrating circuits 96, 96 to reset the circuits to the initial state (output=0) when starting to detect indoor conditions, and feeds a stop signal to the integrating circuits 96, 96 to terminate the integrating operation when the output of the adder 97 obtained via the A/D converter 82 has become not lower than 1 V. The output of the adder 97 which is 1 V means in the present embodiment the output value of the adder obtained when a spotlight with an output of 10 mW is projected on a reflecting surface positioned 1 m away from the LED and having a reflectance of 100%.

Figure 14:
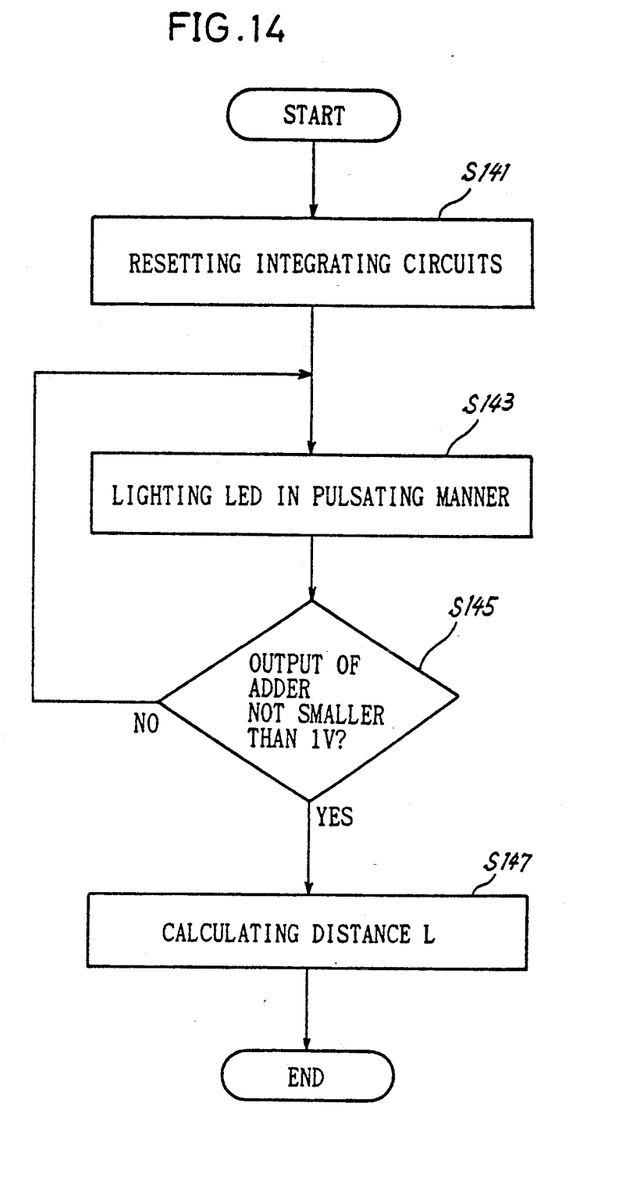
FIG. 14 is a flow chart showing the operation of the measuring circuit.

FIG. 14 shows the operation of the measuring circuit 94.

First in step S141, the integrating circuits are reset to the initial state, and specified one of LEDs is turned on for 100 microseconds in a pulsating manner in step S143. Step S145 checks whether the resulting output of the adder is at least 1 V.

If the adder output is found to be smaller than 1 V in step S145, the sequence returns to step S143 to turn on the LED again in a pulsating manner.

On the other hand, when the adder output is found to be at least 1 V in step S145, the digital voltage values of the sum (I1+I2) of the output currents I1, I2 and the difference (I2−I1) therebetween are substituted in Equation (10) to calculate the distance Px in the next step S147. Based on the calculated distance Px, the three-dimensional coordinates (x0, y0, z0) of the reflecting point A and the distance L from the focal position B to the reflecting point A are thereafter calculated in the same manner as in the first embodiment.

Although the present embodiment employs the one-dimensional PSD, a system with use of a two-dimensional PSD can be similarly constructed as in the second embodiment.

According to the present embodiment described above, the three-dimensional coordinates (x0, y0, z0) of the reflecting point A and the distance L from the focal position B to the reflecting point A can be calculated with high accuracy, so that the indoor conditions can be detected accurately. This realizes highly reliable control of the air conditioner.

Other Applications

The indoor condition detecting unit 5 described is applicable not only to the air conditioner 3 but also to illumination devices, AV devices, etc.

For example in application to illumination devices which are arranged within a room, the illumination devices will be on-off controlled so as to increase the amount of light in accordance with the area of the interior of the room or to locally illuminates a location where many people are present.

As an application to AV devices, the unit will be useful for increasing the volume of sound according to the interior area of rooms or orienting a screen or speaker toward a direction in which many people are present.

The system of the present invention is of course not limited to the foregoing embodiments in construction but can be modified variously by one skilled in the art without departing from the spirit of the invention as defined in the appended claims.

For example, the light-emitting assembly 6 of the indoor condition detecting unit 5 is not limited to the array 61 of radially arranged LEDs shown in FIG. 4. It is possible to use an array of LEDs arranged in parallel to one another in combination with an array of microlenses provided in front of the LED array for radially deflecting the light from the LED array.

What is claimed is:

1. A system to be installed within a room for detecting indoor condition data including data as to the interior area of the room and the number and position of occupants therein, the system comprising:
   light-emitting means for emitting a spotlight having an optical axis extending from one point toward an interior surface of the room and oriented toward successively varying directions to form a multiplicity of light spots dispersed on the interior surface at approximately equal spacings, means for controlling and driving the light-emitting means so as to form the multiplicity of light spots one by one successively, optical means disposed besides the light-emitting means at a specified distance therefrom for concentrating light reflected from a reflecting surface provided by the interior surface or an object inside the room, a position sensitive light detector having a light detecting surface at the position where the reflected light is concentrated for outputting signals in accordance with a light incident position on the light detecting surface, first arithmetic means for calculating three-dimensional coordinates of a reflecting position on the reflecting surface from the signal outputs from the position sensitive light detector and serving as input data, based on the principle of triangulation of the three positions of a focal position of the light-emitting means, the position of center of the optical means and the reflecting position, second arithmetic means for calculating the indoor condition data based on the result of calculation obtained by the first arithmetic means for the entire region of the reflecting surface, and means for outputting the result of calculation by the second arithmetic means.

2. A system as defined in claim 1 which comprises indoor condition memory means for storing the result of calculation obtained by the second arithmetic means when no occupant is present in the room and the result of calculation obtained by the second arithmetic means when one or a plurality of occupants are present in the room.

3. A system as defined in claim 1 wherein the first arithmetic means comprises means for detecting variations in the output signals of the light detector, means for integrating the output of the signal processing means, and means for causing the light-emitting means to subsequently emit a spotlight when the output of the integrating means is in excess of a predetermined value and calculating three-dimensional coordinates of the reflecting position based on the output.

4. An air conditioner for air-conditioning the interior of a room in accordance with indoor condition data including data as to the interior area of the room and the number and position of occupants therein, the air conditioner comprising:

light-emitting means for emitting a spotlight having an optical axis extending from one point toward an interior surface of the room and oriented toward successively varying directions to form a multiplicity of light spots dispersed on the interior surface at approximately equal spacings, means for controlling and driving the light-emitting means so as to form the multiplicity of light spots one by one successively, optical means disposed beside the light-emitting means at a specified distance therefrom for concentrating light reflected from a reflecting surface provided by the interior surface or an object inside the room, a position sensitive light detector having a light detecting surface at the position where the reflected light is concentrated for outputting signals in accordance with a light incident position on the light detecting surface, first arithmetic means for calculating three-dimensional coordinates of a reflecting position on the reflecting surface from the signal outputs from the position sensitive light detector and serving as input data, based on the principle of triangulation of the three positions of a focal position of the light-emitting means, the position of center of the optical means and the reflecting position, second arithmetic means for calculating the indoor condition data based on the result of calculation obtained by the first arithmetic means for all of the multiplicity of light spots, indoor condition memory means for storing the result of calculation obtained by the second arithmetic means when no occupant is present in the room and the result of calculation obtained by the second arithmetic means when one or a plurality of occupants are present in the room, and means for controlling the air-conditioning operation based on the data stored in the indoor condition memory means.

5. An air conditioner as defined in claim 4 further comprising:

a remote control unit having a temperature sensor to be disposed in an optional position within the room for detecting the internal temperature of the room, the remote control unit being operable to send data detected by the temperature sensor to the optical means as a light signal, temperature detecting means for receiving the light signal from the remote control unit to extract temperature data from the light signal and feeding the temperature data to the controlling means, and third arithmetic means for calculating the position of the remote control unit within the room in accordance with the position of incidence of the light signal from the unit on the light detecting surface of the position sensitive light detector, the control means being operable to control the air-conditioning operation in accordance with the temperature data and the position of the remote control unit.

* * * * *